United States Patent
Hirayama et al.

(10) Patent No.: US 10,818,408 B2
(45) Date of Patent: Oct. 27, 2020

(54) INSULATED WIRE

(71) Applicant: TOYOTA JIDOSHA KABUSHIKI KAISHA, Toyota-shi, Aichi-ken (JP)

(72) Inventors: Shinichiro Hirayama, Toyota (JP); Takashi Yamada, Okazaki (JP); Hikohito Yamazaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 61 days.

(21) Appl. No.: 16/058,129

(22) Filed: Aug. 8, 2018

(65) Prior Publication Data
US 2019/0066868 A1 Feb. 28, 2019

(30) Foreign Application Priority Data
Aug. 28, 2017 (JP) ................. 2017-163111

(51) Int. Cl.
*H01B 3/30* (2006.01)
*H01B 7/02* (2006.01)
*C09D 5/00* (2006.01)
*C09D 177/10* (2006.01)
*C09D 179/08* (2006.01)
*C08G 73/10* (2006.01)

(52) U.S. Cl.
CPC .......... *H01B 3/306* (2013.01); *C08G 73/105* (2013.01); *C08G 73/1071* (2013.01); *C09D 5/002* (2013.01); *C09D 177/10* (2013.01); *C09D 179/08* (2013.01); *H01B 3/305* (2013.01); *H01B 3/307* (2013.01); *H01B 7/0216* (2013.01)

(58) Field of Classification Search
CPC .... C09D 179/08; C09D 177/10; H01B 3/306; H01B 3/305; H01B 7/0216; C08G 73/1071; C08G 73/1042
USPC ................ 174/120 R, 120 SR; 428/383, 380
See application file for complete search history.

(56) References Cited

U.S. PATENT DOCUMENTS

2013/0161065 A1 6/2013 Honda et al.
2018/0053580 A1* 2/2018 Su ......................... H01B 3/306

FOREIGN PATENT DOCUMENTS

| CN | 1871668 A | 11/2006 |
|----|-----------|---------|
| CN | 103177807 A | 6/2013 |
| CN | 104744938 A | 7/2015 |
| JP | 2013-101758 A | 5/2013 |
| WO | 2005/041215 A1 | 5/2005 |

* cited by examiner

*Primary Examiner* — Camie S Thompson
(74) *Attorney, Agent, or Firm* — Sughrue Mion, PLLC

(57) ABSTRACT

An insulated wire has a conductor, and an insulating film including a first insulating layer covering the conductor and a second insulating layer covering the first insulating layer. The second insulating layer contains a polyimide or a polyamideimide as a main component. The first insulating layer contains a reaction product of a carboxylic acid dianhydride and a diamine as an adhesive component and a component that is the same as the main component in the second insulating layer. At least one of the carboxylic acid dianhydride and the diamine has a carbonyl group.

5 Claims, 2 Drawing Sheets

INSULATED WIRE

INCORPORATION BY REFERENCE

The disclosure of Japanese Patent Application No. 2017-163111 filed on Aug. 28, 2017 including the specification, drawings and abstract is incorporated herein by reference in its entirety.

BACKGROUND

1. Technical Field

The disclosure relates to an insulated wire.

2. Description of Related Art

A coil that is used in a motor, a transformer, and the like is formed by winding an insulated wire around a core. An insulated wire includes an insulating film on the outer circumference of a conductor such as copper. The insulated film is formed by, for example, applying on a conductor and baking an insulating coating material (varnish) obtained by dissolving a precursor of a polyimide or a polyamideimide, which has excellent heat resistance, electrical insulating properties, and mechanical strength, in an organic solvent.

Regarding an insulated wire such as described above, an insulated wire is disclosed in Japanese Unexamined Patent Application Publication No. 2013-101758 (JP 2013-101758 A), the insulated wire having a conductor; a first insulating layer covering the conductor; and a second insulating layer covering the first insulating layer, in which the first insulating layer is formed by applying and baking a first polyimide resin varnish containing, as a main component, a first polyimide precursor obtainable by reacting 4,4'-diaminodiphenyl ether with pyromellitic dianhydride, and the second insulating layer is formed by applying and baking a polyimide resin varnish containing, as a main component, a second polyimide precursor obtainable by reacting an aromatic diamine with an aromatic tetracarboxylic acid dianhydride, the second polymer precursor having an imide group concentration after imidation of less than 33.0%.

SUMMARY

Along with miniaturization of electronic devices and electrical devices, maintaining close adhesion between a conductor and an insulating film is needed. That is, when the shape of a device becomes complicated as a result of miniaturization of the device, and the curvature of the winded insulated wire becomes large, the conductor and the insulating film undergo interfacial peeling at a site where the curvature is relatively large as described above. Accordingly, there has been a problem that atmospheric discharge occurs, and the performance is deteriorated. Therefore, it has been desired to further increase the adhesive strength between the conductor and the insulating film.

The disclosure provides an insulated wire having excellent adhesiveness between a conductor and an insulating film such that even though the curvature is increased, the conductor and the insulating film do not undergo interfacial peeling.

The present inventors conducted a thorough investigation, and as a result, the inventors found that when an insulating film is formed to have a multilayer structure and a particular molecule containing a carbonyl group is introduced as an adhesive component into the innermost layer that is brought into contact with a conductor, the carbonyl groups are oriented and interact with the conductor, and thus, the adhesive strength is further increased. Thus, the inventors completed the present disclosure. The gist of the disclosure is as follows.

An aspect of the disclosure relates to an insulated wire. The insulated wire includes a conductor, and an insulating film includes a first insulating layer that covers the conductor, and a second insulating layer that covers the first insulating layer. The second insulating layer contains a polyimide or a polyamideimide as a main component. The first insulating layer contains a reaction product of a carboxylic acid dianhydride and a diamine, as an adhesive component and a predetermined component that is the same as the main component in the second insulating layer. At least one of the carboxylic acid dianhydride and the diamine has a carbonyl group.

In the insulated wire according to the aspect of the disclosure, the proportion of the polyimide or polyamideimide in the second insulating layer may be 50% by weight or more.

In the insulated wire according to the aspect of the disclosure, the proportion of the polyimide in the second insulating layer may be 50% by weight or more.

In the insulated wire according to the aspect of the disclosure, the carboxylic acid dianhydride may be 4,4'-carbonyldiphthalic anhydride represented by Formula I, and the diamine may be 2,2-bis[4-(4-aminophenoxy)phenyl]propane represented by Formula II.

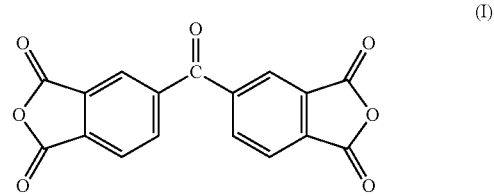 [SMILES: O=C(c1ccc2c(c1)C(=O)OC2=O)c1ccc2c(c1)C(=O)OC2=O]

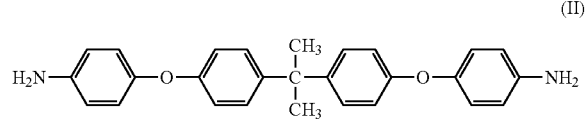

In the insulated wire according to the aspect of the disclosure, the first insulating layer may contain the adhesive component at a proportion of 0.5 mol % to 5 mol % when the content of the predetermined component is designated as 100 mol %.

According to the aspect of the disclosure, an insulated wire having superior adhesive strength between the conductor and the insulating film can be obtained. Therefore, even though the curvature of the insulated wire is increased along with miniaturization of a motor or the like, the conductor and the insulating film do not undergo interfacial peeling at a site where the curvature is relatively large as described above.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
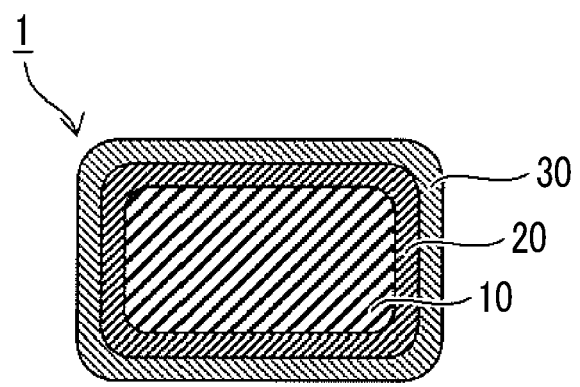
FIG. 1 is a sectional view illustrating an insulated wire according to an embodiment of the disclosure.

Hereinafter, the disclosure will be described in detail based on embodiments. FIG. 1 is a sectional view illustrating an insulated wire according to an embodiment of the disclosure. As illustrated in FIG. 1, the insulated wire 1 includes, on the surface of a conductor 10, an insulating film including a first insulating layer 20 and a second insulating layer 30.

Conductor

According to the present embodiment, the conductor 10 has, for example, a flat square-shaped cross-section which measures 0.5 mm to 10 mm on each side. The material for the conductor 10 can be appropriately selected from copper, a copper alloy, aluminum, an aluminum alloy, iron, silver, and alloys thereof. From the viewpoints of mechanical strength, electrical conductivity, and the like, for example, the material is preferably copper or a copper alloy.

Second Insulating Layer

The second insulating layer 30 contains a polyimide or a polyamideimide as a main component. Polyimides and polyamideimides have excellent heat resistance, electrical insulating properties, and mechanical strength. Therefore, high reliability can be obtained in applications such as insulated wires for motor coils that are used in, for example, automobiles, electric trains, and ships.

A polyimide can be obtained from an acid dianhydride and a diamine via a polyamide acid. The acid dianhydride is not particularly limited, and examples include pyromellitic dianhydride (PMDA), 2,3,6,7-naphthalenetetracarboxylic acid dianhydride, 3,3',4,4'-biphenyltetracarboxylic acid dianhydride, 1,2,5,6-naphthalenetetracarboxylic acid dianhydride, 2,2',3,3'-biphenyltetracarboxylic acid dianhydride, 3,3',4,4'-benzophenonetetracarboxylic acid dianhydride, 2,2-bis(3,4-dicarboxyphenyl)propane dianhydride, 3,4,9,10-perylenetetracarboxylic acid dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, and bis(3,4-dicarboxyphenyl)sulfone dianhydride. These can be used singly or as mixtures of two or more kinds thereof.

Examples of the diamine include 2,2-bis[4-(4-aminophenoxy)phenyl]propane, 4,4'-diaminodiphenyl ether (ODA), p-phenylenediamine (PDA), 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenylsulfone, 4,4'-diaminodiphenylsulfone, 4,4'-diaminodiphenyl ether, 3,3'-diaminodiphenyl ether, 3,4'-diaminodiphenyl ether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl-N-methylamine, 4,4'-diaminodiphenyl-N-phenylamine, 1,4-diaminobenzene (p-phenylenediamine), 1,3-diaminobenzene, and 1,2-diaminobenzene. These can be used singly or as mixtures of two or more kinds thereof.

A polymerization method for producing a polyamide acid from the acid dianhydride and the diamine is not particularly limited, and any known method can be used. For example, a method of dissolving an acid dianhydride and a diamine in an organic solvent, and stirring the organic solvent solution of a polyamide acid thus obtained, under predetermined temperature conditions, until the polymerization of the acid dianhydride and the diamine is completed, may be mentioned.

The concentration of the polyamide acid solution is usually 5% to 35% by weight. When the concentration is in the range described above, an appropriate molecular weight and an appropriate solution viscosity can be obtained. The molar ratio between the acid dianhydride and the diamine in the polyamide acid solution (acid dianhydride:diamine) can be adjusted to the range of, for example, 1.5:1 to 1:1.5; however, the disclosure is not limited to this. For example, it is preferable that the compounds are used in substantially equimolar amounts.

The solvent for synthesizing the polyamide acid is not particularly limited; however, it is preferable to use an amide-based solvent, and specific examples include N,N-dimethylformamide, N,N-dimethylacetamide, and N-methyl-2-pyrrolidone.

A coating liquid (varnish) formed from the above-mentioned polyamide acid solution is further applied on the surface of the first insulating layer provided on the surface of the conductor, and a coating film is formed. Subsequently, the coating film is baked at a temperature of 170° C. or higher, and preferably 200° C. or higher, and a dehydration-cyclization reaction of the polyamide acid is performed. Thereby, a second insulating layer 30 containing a polyimide as a main component can be formed. The phrase "containing as a main component" means that 50% by weight or more in an insulating layer is constituted by a polyimide or a polyamideimide.

The coating liquid may include, as needed, known additives, such as a dehydrating agent such as acetic anhydride; an imidation accelerator such as picoline, quinoline, isoquinoline, or pyridine; various surfactants; and various organic silane coupling agents, to the extent that the effects of the disclosure are not impaired. As needed, a polymer other than a polyimide can also be added to the coating liquid to the extent that the effects of the disclosure are not impaired. The amounts of the above-mentioned additives are not particularly limited; however, it is preferable that the total amount of the additives in the second insulating layer is adjusted to be 50% by weight or less.

A polyamideimide is a heat-resistant polymer having both an imide bond and an amide bond in the main chain. A second insulating layer 30 having excellent mechanical characteristics and heat resistance can be easily obtained by forming a coating film from a solution including a polyamideimide and drying the solution.

A polyamideimide can be obtained by, for example, a method such as follows. That is, a trimellitic acid component (trimellitic anhydride chloride, trimellitic anhydride, or the like) and a diamine component (one of various diamines or diisocyanate derivatives of various diamines), which are raw materials, are mixed preferably at an equimolar ratio. The above-mentioned mixture is subjected to, for example, a polymerization reaction in an amide-based solvent, a poor solvent such as water is added to the solution thus obtainable, and thus, a polyamideimide is precipitated as a precipitate. Subsequently, the above-mentioned precipitate is separated by filtration and dried, and as needed, the dried product is subjected to thermal imidation. Thus, a polyamideimide can be obtained.

The trimellitic acid component is not particularly limited; however, trimellitic anhydride chloride is preferred. It is also acceptable that a portion of the trimellitic acid component is appropriately replaced with a component such as pyromellitic acid, benzophenonetetracarboxylic acid, or biphenyltetracarboxylic acid.

Regarding the diamine component, for example, m-phenylenediamine, p-phenylenediamine, 4,4'-diphenylmethanediamine, 4,4'-diphenyl ether diamine, diphenylsulfone-4,4'-diamine, diphenyl-4,4'-diamine, o-tolidine, 2,4-tolylenediamine, 2,6-tolylenediamine, xylylenediamine, naphthalenediamine, or diisocyanate derivatives of these compounds can be used. The above-mentioned diamine components may be used singly, or two or more kinds thereof may be used in combination.

The solid-state polyamideimide that has been isolated in the manner as described above is dissolved in, for example, a mixed solvent including an amide-based solvent and an ether-based solvent, and a coating liquid (varnish) can be obtained thereby. Regarding the amide-based solvent, for example, N-methyl-2-pyrrolidone, N,N-dimethylformamide, and N,N-dimethylacetamide are applicable.

The ether-based solvent is not particularly limited; however, it is preferable to use an ether-based solvent having a boiling point that is higher than that of the amide-based solvent. Specific examples of the ether-based solvent include solvents such as diethylene glycol dimethyl ether, triethylene glycol dimethyl ether, tetraethylene glycol dimethyl ether, diethylene glycol, and triethylene glycol.

The concentration of the polyamideimide in the coating liquid is preferably set to 5% to 30% by weight, and more preferably to 10% to 20% by weight; however, the concentration is not to be limited to this range.

The coating liquid (varnish) including a polyamideimide such as described above is applied on the surface of the first insulating layer to form a coating film, and then the coating film is baked at a temperature of 300° C. or higher, and preferably 400° C. or higher. Thus, the second insulating layer 30 can be obtained.

To the coating liquid of polyamideimide, known additives such as various surfactants and organic silane coupling agents may be added as needed, to the extent that the effects of the disclosure are not impaired. According to necessity, a polymer other than a polyamideimide can also be added to the coating liquid, to the extent that the effects of the disclosure are not impaired. The amount of the above-mentioned additives is not particularly limited; however, it is preferable that the total amount of the additives in the second insulating layer is adjusted to be 50% by weight or less.

The thickness of the second insulating layer 30 is not particularly limited; however, in order to secure sufficient insulating properties, mechanical characteristics, and heat resistance, it is preferable to adjust the thickness to the range of 10 μm to 200 μm. In order to obtain the above-mentioned thickness, application and baking of the coating liquid such as described above can be repeatedly carried out two or more times.

First Insulating Layer

The first insulating layer 20 contains a reaction product of a carboxylic acid dianhydride and a diamine as an adhesive component and a component that is the same as the main component of the polyimide or polyamideimide in the second insulating layer 30. Any one of the carboxylic acid dianhydride and the diamine has a carbonyl group. Here, the carbonyl group does not include the carbonyl group that constitutes an imide group in the reaction product obtained between the carboxylic acid dianhydride and the diamine, and the carbonyl group means a carbonyl group that is bonded to a site other than an imide group. The present inventors performed a polar functional group analysis using an atomic force microscope (AFM) and an analysis by polarized IR spectroscopy, and found that when an adhesive component containing a carbonyl group is incorporated, the number of relatively highly polar functional groups increases at the interface between the conductor 10 and the first insulating layer 20, and particularly carbonyl groups are more strongly oriented and interact with the conductor 10, so that the adhesive strength is further increased.

A carboxylic acid dianhydride having a carbonyl group may have at least one carbonyl group or may have two or more carbonyl groups in the molecule. The carbon atom of the carbonyl group is not particularly limited; however, the carbon atom is not a carbon atom that constitutes an aromatic ring and is preferably a carbon atom located outside a ring. Thereby, flexibility of the molecular structure is further enhanced, and carbonyl groups can be more strongly oriented.

Specific examples of the carboxylic acid dianhydride having a carbonyl group include 4,4'-carbonyldiphthalic anhydride, and any of these can be used singly, or a plurality of these compounds can be used in combination. Among them, 4,4'-carbonyldiphthalic anhydride represented by Formula I is suitably used because the carbonyl groups are oriented more strongly, and the effect of enhancing adhesiveness is superior.

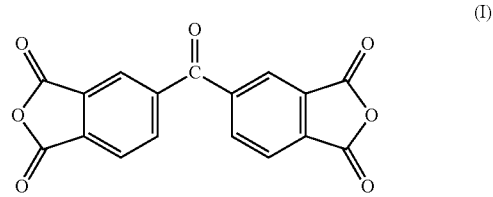

(I)

In a case in which the diamine has a carbonyl group, the carboxylic acid dianhydride does not need to have a carbonyl group. Regarding the carboxylic acid dianhydride such as described above, there are no particular limitations, and any compound can be appropriately selected for use from pyromellitic dianhydride (PMDA), 2,3,6,7-naphthalenetetracarboxylic acid dianhydride, 3,3',4,4'-biphenyl tetracarboxylic acid dianhydride, 1,2,5,6-naphthalenetetracarboxylic acid dianhydride, 2,2',3,3'-biphenyl tetracarboxylic acid dianhydride, 3,3',4,4'-benzophenone tetracarboxylic acid dianhydride, and the like.

The diamine having a carbonyl group may have at least one carbonyl group, or may have two or more carbonyl groups in the molecule, similar to the carboxylic acid dianhydride. The carbon atom of the carbonyl group is not particularly limited; however, the carbon atom is not a carbon atom that constitutes an aromatic ring and is preferably a carbon atom located outside a ring. Thereby, flexibility of the molecular structure is further enhanced, and carbonyl groups can be more strongly oriented.

Specific examples of the diamine having a carbonyl group include 3,3'-diaminobenzophenone and 4,4'-diaminobenzophenone, and these compounds can be used singly, or a plurality of these compounds can be used in combination.

In a case in which the carboxylic acid dianhydride has a carbonyl group, the diamine does not need to have a carbonyl group. Regarding the diamine such as described above, there are no particular limitations, and any one of 2,2-bis[4-(4-aminophenoxy)phenyl]propane, 4,4'-diaminodiphenyl ether (ODA), p-phenylenediamine (PDA), 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenylsulfone, 4,4'-diaminodiphenylsulfone, 4,4'-diaminodiphenyl ether, 3,3'-diaminodiphenyl ether, 3,4'-diaminodiphenyl ether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl-N-methylamine, 4,4'-diaminodiphenyl-N-phenylamine, 1,4-diaminobenzene (p-phenylenediamine), 1,3-diaminobenzene, 1,2-diaminobenzene, and the like can be used singly, or any two or more kinds thereof can be used as a mixture.

Particularly, regarding a combination of the carboxylic acid dianhydride and the diamine that constitute an adhesive component, a combination of 4,4'-carbonyldiphthalic anhydride represented by Formula I described above and 2,2-bis[4-(4-aminophenoxy)phenyl]propane represented by the following Formula II is preferably used because stronger adhesiveness between the conductor 10 and the first insulating layer 20 can be obtained.

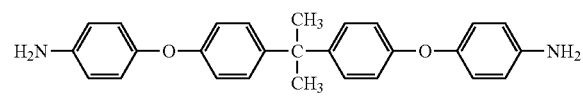

(II)

When the content of the adhesive component in the first insulating layer 20 is too small, an effect of increasing the adhesiveness between the conductor 10 and the first insulating layer 20 is not obtained, and in contrast, when the content is too large, the characteristics of the polyimide or polyamideimide, which is a main component, are relatively impaired. Therefore, the content of the adhesive component in the first insulating layer 20 is set as appropriate in consideration of the balance between the above effect of increasing the adhesiveness and the impairment of the characteristics of the polyimide or polyamideimide. The content of the adhesive component in the first insulating layer 20 is not particularly limited; however, specifically, the content of the adhesive component in the first insulating layer 20 is preferably adjusted to 0.5 mol % to 5 mol %, and more preferably 1 mol % to 5 mol %, while the content of the main component is designated as 100 mol %.

On the occasion of forming the first insulating layer 20, for example, the following method is preferred. First, a solution of a polyamide acid, which is a reaction product of a carboxylic acid dianhydride and a diamine, is produced as an adhesive component. At least one of the carboxylic acid dianhydride and the diamine has a carbonyl group. Separately from the solution of the adhesive component, a solution of the above-mentioned polyamide acid or polyamideimide is produced as a main component. Subsequently, the solution of the adhesive component and the solution of the main component are combined, and the mixture is subjected to copolymerization under predetermined temperature conditions. Thus, a coating liquid (varnish) to be applied on a conductor 10 is obtained. It is also possible to mix monomers that respectively constitute the adhesive component and the main component altogether and produce the mixture into a single liquid, without following the method described above. However, there are occasions in which segregation occurs, and a predetermined varnish may not be obtained.

The concentration of the polyamide acid in the coating liquid of the adhesive component may vary depending on the concentration in the coating liquid of the main component; however, for example, it is preferable to adjust the concentration to about 5% to 35% by weight. When the concentration is in the range described above, an appropriate molecular weight and an appropriate solution viscosity can be obtained. The molar ratio between the carboxylic acid dianhydride and the diamine (carboxylic acid dianhydride: diamine) in the coating liquid of the adhesive component can be adjusted to be, for example, in the range of 1.5:1 to 1:1.5; however, the molar ratio is not limited to this. For example, it is preferable that the components are substantially in equimolar amounts.

The solvent for the coating liquid of the adhesive component is not particularly limited; however, it is preferable to use an amide-based solvent, and specific examples include N,N-dimethylformamide, N,N-dimethylacetamide, and N-methyl-2-pyrrolidone.

The coating liquid (varnish) thus obtained is applied on the surface of the conductor to form a coating film, and then the coating film is baked at a temperature of 170° C. or higher, and preferably 200° C. or higher. The first insulating layer 20 can be formed thereby.

As needed, known additives, such as a dehydrating agent such as acetic anhydride; an imidation accelerator such as picoline, quinoline, isoquinoline, or pyridine; various surfactants; and various organic silane coupling agents may also be added to the coating liquid, to the extent that the effects of the disclosure are not impaired. As needed, a polymer other than a polyimide or a polyamideimide can also be added to the coating liquid, to the extent that the effects of the disclosure are not impaired. The amounts of the above-mentioned additives are not particularly limited; however, it is preferable that the total amount of the additives in the first insulating layer is adjusted to 50% by weight or less.

The thickness of the first insulating layer 20 is not particularly limited; however, when the thickness is too small, the adhesiveness between the conductor 10 and the first insulating layer 20 is decreased, and a predetermined effect is not obtained. In contrast, when the thickness is too large, there is a possibility that the physical properties may change. Therefore, the thickness of the first insulating layer 20 is set as appropriate, in consideration of the balance between the adhesiveness to the conductor 10 and the physical properties of the first insulating layer 20. The thickness of the first insulating layer 20 is not particularly limited; however, specifically, it is preferable to adjust the thickness in the range of 0.01 μm to 10 μm. In order to obtain the above-mentioned thickness, application and baking of the coating liquid such as described above can be repeatedly performed two or more times.

In the present embodiment, as illustrated in FIG. 1, the cross-sectional shape of the conductor 10 is a flat square shape; however, the shape is not limited to this, and for example, various shapes such as a circular shape, a rectangular shape, and a shape obtainable by rounding the corners of a rectangular shape can be appropriately employed. When a coil is produced by edgewise processing using an insulated wire having a rectangular-shaped cross-sectional shape, a coil that undergoes deformation to a relatively reduced extent can be obtained. In the coil such as described above, strong adhesiveness between the conductor 10 and the first insulating layer 20 can be effectively utilized. Regarding the layers that constitute the insulating film, it is acceptable as long as the layers include the first insulating layer 20 as the innermost layer that is in contact with the conductor 10 and include the second insulating layer 30 on the outer side of the first insulating layer 20, and there are no limitations other than the above-described condition. For example, the insulating film may include another layer on the outer side of the second insulating layer 30.

Hereinafter, the disclosure will be described in more detail by way of Experiment Examples; however, the disclosure is not intended to be limited to these.

Experiment Example 1

1. Production of Varnish

Six types of varnishes having the following compositions were produced. A varnish including PI-A was produced by performing polymerization for 16 hours at 30° C. at a concentration of 20% by weight using N-methylpyrrolidone as a solvent. Varnishes including components other than PI-A were produced by polymerizing one kind or two kinds of compounds at a total concentration of 20% by weight for 16 hours at 30° C. using N-methylpyrrolidone as a solvent. In regard to (2) to (5), two varnishes that had been respectively produced were combined, and copolymerization was performed for 16 hours at 30° C. The concentration of the varnishes of (1) to (6) thus obtained was adjusted to 20% by weight. BPDA and BAPP in (3), and CDDA and BAPP in (4) to (6) were used in equimolar amounts.

PI-A (1)

PI-A:BAPP=100 mol:5.0 mol (2)

PI-A:BPDA+BAPP=100 mol:5.0 mol (3)

PI-A:CDDA+BAPP=100 mol:0.5 mol (4)

PI-A:CDDA+BAPP=100 mol:2.5 mol (5)

PI-A: CDDA+BAPP=100 mol:5.0 mol (6)

Abbreviations

PI-A: Polyamic acid varnish as a main component (manufactured by Yamaso Micron K.K., KAPTON varnish)

BAPP: 2,2-bis[4-(4-aminophenoxy)phenyl]propane (diamine)

BPDA: 4,4'-Biphthalic anhydride (carboxylic acid dianhydride that does not have a carbonyl group)

CDDA: 4,4'-Carbonyldiphthalic anhydride (carboxylic acid dianhydride having a carbonyl group)

2. Experiment Method

Production of Test Sheet

Each of the varnishes of (1) to (6) was uniformly applied on a copper foil, and the varnish was cured for 3 minutes in an oven at 170° C. The above-described operation was repeated six times, and then the copper foil was further heated for 1.5 hours in an oven at 170° C. Thus, a test sheet was produced.

Measurement of Peeling Strength

An epoxy resin (thickness about 400 μm) was applied on the varnish surface of the test sheet thus obtained, and thus the test sheet was reinforced. A plurality of lines of a flexible tape having a width of 1 mm (length about 100 mm) was attached on the copper foil surface on the opposite side, and an etching treatment was performed to dissolve copper at sites other than the sites where the flexible tape was attached. The test sheet was dried, and thus a sample piece was produced.

The sample piece thus produced was mounted on a tensile tester, and the flexible tape was pulled to detach the copper from the varnish. Thus, the peeling strength between the copper and the varnish was measured. The measurement results are presented in Table 1 and FIG. 2. In Table 1, the second measurement value for varnish (1) was a singular point and was excluded from the analysis.

Measurement Conditions

Measurement conditions in constant temperature and constant humidity chamber: 23±2° C., 50±5% RH Tensile tester: VG1E manufactured by Toyo Seiki Kogyo Co., Ltd.

Peeling angle: 90°

Peeling rate: 50 mm/min

Peeling distance: 20 mm (null distance: 3 mm)

Sample piece width: 1 mm

TABLE 1

|  | Varnish (1) | Varnish (3) | Varnish (6) |
| --- | --- | --- | --- |
| Average | 0.4025 | 0.46 | 0.68 |
| N = 1 | 0.39 | 0.51 | 0.69 |
| N = 2 | — | 0.41 | 0.72 |
| N = 3 | 0.39 | 0.56 | 0.64 |
| N = 4 | 0.4 | 0.42 | 0.7 |
| N = 5 | 0.43 | 0.38 | 0.66 |

Unit: N/mm

Figure 2:
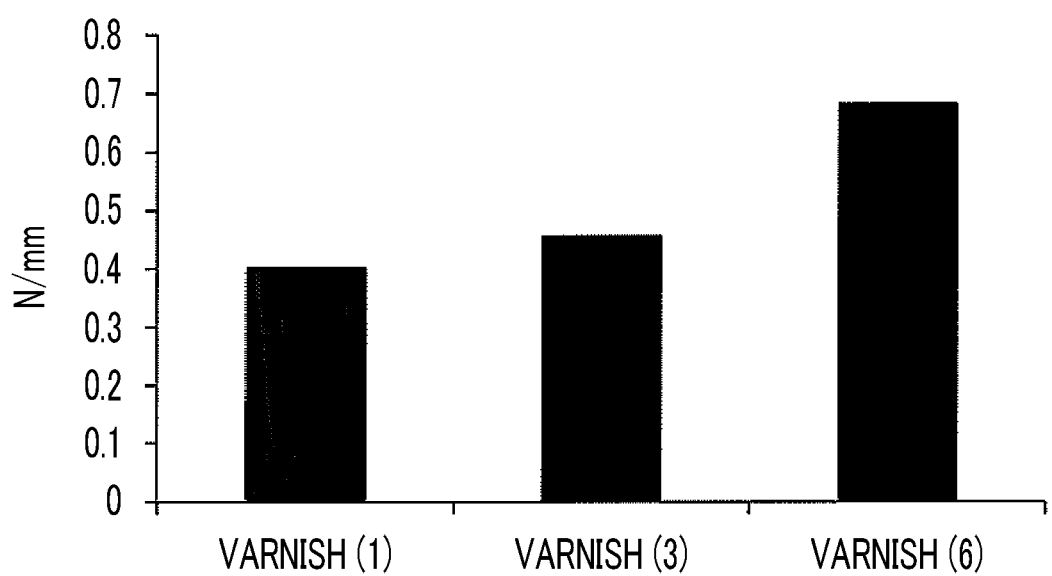
FIG. 2 is a graph showing the measurement results of Experiment Example 1.

As shown in Table 1 and FIG. 2, it was clear that when a reaction product of a carboxylic acid dianhydride having a carbonyl group was used as the adhesive component, excellent adhesiveness between the copper foil and the varnish was obtained. Also in regard to varnish (4) and varnish (5), the tensile strength (the peeling strength) exceeded 0.55 N/mm, and it was found that even when the concentration of the adhesive component was lowered, an effect of enhancing adhesiveness was obtained.

Experiment Example 2

For the test sheets obtained by applying the varnish (1) and varnish (6) described above on the copper foil, the varnish surface of each test sheet was polished to decrease the thickness to 1 μm or less, and the adhesive interface between the copper and the varnish was analyzed by high-sensitivity polarized IR measurement. The measurement results are presented in FIG. 3.

Figure 3:
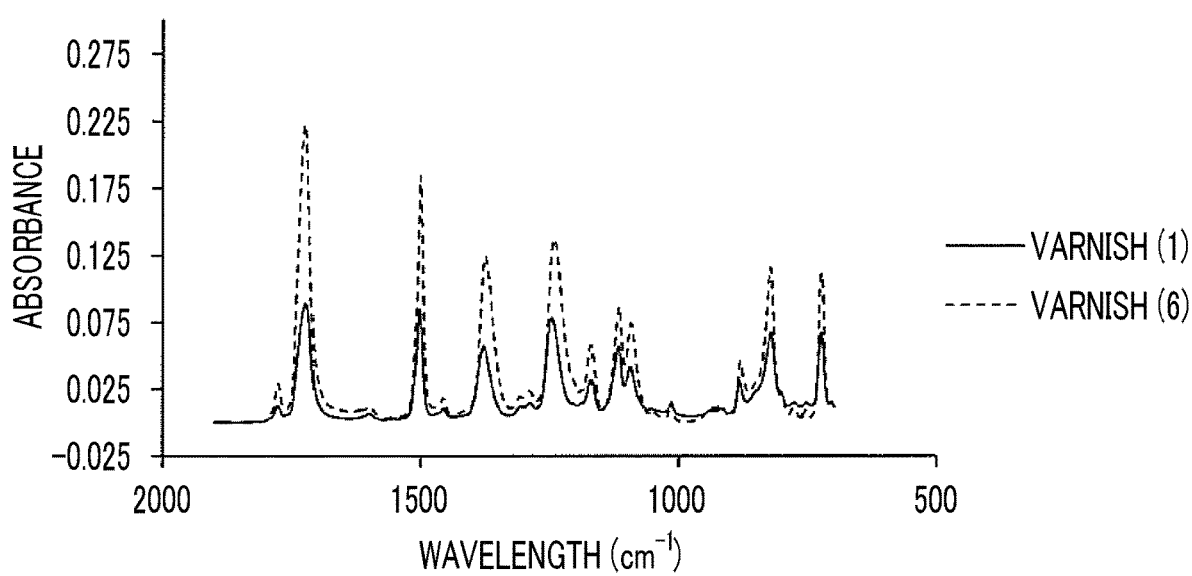
FIG. 3 is a graph showing a high-sensitivity polarized IR spectrum measured in Experiment Example 2.

As shown in FIG. 3, in the test sheet where varnish (6) was applied, the absorbance of the peak representing a carbonyl group ($1720 \text{ cm}^{-1}$) is relatively large compared to the peak representing an aromatic ether ($1240 \text{ cm}^{-1}$) as a reference. From the results described above, a difference in the molecular orientation properties was recognized at the interface in varnish (6) compared to varnish (1), and particularly, it was suggested that carbonyl groups were more strongly oriented and were interacting with the copper.

What is claimed is:

1. An insulated wire comprising:
   a conductor; and
   an insulating film including a first insulating layer that covers the conductor; and a second insulating layer that covers the first insulating layer,
   wherein the second insulating layer contains a polyimide or a polyamideimide as a main component;
   the first insulating layer contains (1) a reaction product of a carboxylic acid dianhydride and a diamine as an adhesive component and (2) a predetermined component that is the same as the main component in the second insulating layer; and
   at least one of the carboxylic acid dianhydride and the diamine has a carbonyl group.

2. The insulated wire according to claim 1, wherein a proportion of the polyimide or polyamideimide in the second insulating layer is 50% by weight or more.

3. The insulated wire according to claim 2, wherein the proportion of the polyimide in the second insulating layer is 50% by weight or more.

4. The insulated wire according to claim 1, wherein:
the carboxylic acid dianhydride is 4,4'-carbonyldiphthalic anhydride represented by the following Formula I; and
the diamine is 2,2-bis[4-(4-aminophenoxy)phenyl]propane represented by the following Formula II.

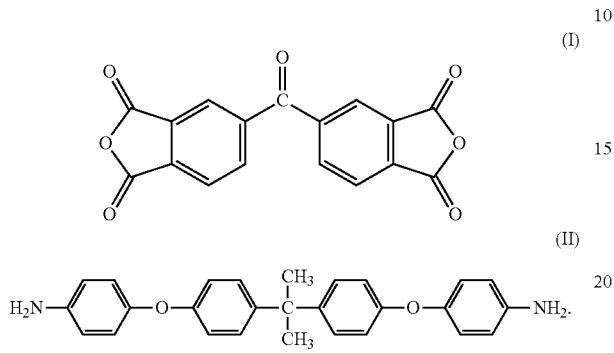

5. The insulated wire according to claim 1, wherein the first insulating layer contains the adhesive component at a proportion of 0.5 mol % to 5 mol % when a content of the predetermined component is designated as 100 mol %.

* * * * *